US009353676B2

United States Patent
Reinisch

(10) Patent No.: US 9,353,676 B2
(45) Date of Patent: May 31, 2016

(54) ACTUATING DEVICE AND JOINT

(71) Applicant: Mahle International GmbH, Stuttgart (DE)

(72) Inventor: Peter Reinisch, Wolfsberg (AT)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 14/412,657

(22) PCT Filed: Jun. 28, 2013

(86) PCT No.: PCT/EP2013/063631
§ 371 (c)(1),
(2) Date: Jan. 2, 2015

(87) PCT Pub. No.: WO2014/005941
PCT Pub. Date: Jan. 9, 2014

(65) Prior Publication Data
US 2015/0167542 A1 Jun. 18, 2015

(30) Foreign Application Priority Data
Jul. 3, 2012 (DE) .......................... 10 2012 211 535

(51) Int. Cl.
*F02B 37/18* (2006.01)
*F16C 11/06* (2006.01)
*F01D 17/10* (2006.01)

(52) U.S. Cl.
CPC ............ *F02B 37/186* (2013.01); *F01D 17/105* (2013.01); *F16C 11/0661* (2013.01); *F16C 2360/22* (2013.01); *Y02T 10/144* (2013.01); *Y10T 403/32631* (2015.01)

(58) Field of Classification Search
CPC ........... F02D 41/0007; F02D 2041/001; F02B 37/18; F02B 37/183; F02B 37/186; Y10T 403/32655; Y10T 403/32204; Y10T 403/32565; F16C 11/0661; F16C 11/069; F16C 13/02
See application file for complete search history.

(56) References Cited

U.S. PATENT DOCUMENTS 898,391 A * 9/1908 Peterson ............. F16C 11/0661
174/180
1,788,566 A * 1/1931 Dock .......................... F16J 1/22
29/434

(Continued)

FOREIGN PATENT DOCUMENTS

DE 506246 C 9/1930
DE 1916578 A1 10/1970

(Continued)

OTHER PUBLICATIONS

English abstract for DE-19519526.

(Continued)

*Primary Examiner* — Gregory Binda
*Assistant Examiner* — Jonathan Masinick
(74) *Attorney, Agent, or Firm* — Fishman Stewart PLLC

(57) ABSTRACT

An actuating device for bi-directionally adjusting an actuator may include an actuator drive and a coupling device drive-connected to the actuator drive and the actuator. The coupling device may include a first coupling member, a second coupling member and a joint connecting the first coupling member and the second coupling member to each other in an articulated manner. The joint may have a housing which is fixedly connected to the first coupling member. The housing may define a bearing chamber having a first bearing face facing away from the first coupling member. The joint may include a bearing shell fixedly connected to a shaft of the second coupling member. The bearing shell may be arranged in the bearing chamber and have a first counter bearing face facing the first coupling member. The bearing shell may have a second counter bearing face facing away from the first coupling member.

19 Claims, 3 Drawing Sheets

(56) References Cited

U.S. PATENT DOCUMENTS

| | | | | |
|---|---|---|---|---|
| 2,260,240 | A * | 10/1941 | Taylor | F16J 1/14 403/150 |
| 2,838,330 | A * | 6/1958 | Fidler | F16C 11/06 280/93.511 |
| 3,414,302 | A * | 12/1968 | Priest | F16C 11/0661 285/261 |
| 3,689,100 | A | 9/1972 | Schmid et al. | |
| 4,160,626 | A * | 7/1979 | Bell | F04B 9/125 403/122 |
| 4,511,276 | A | 4/1985 | Doutt | |
| 5,115,725 | A * | 5/1992 | Horiuchi | F02B 23/0672 403/125 |
| 5,413,031 | A * | 5/1995 | Kohlmeyer | B23Q 1/5462 403/122 |
| 5,427,067 | A * | 6/1995 | Horiuchi | F02B 23/0672 123/197.3 |
| 5,711,709 | A * | 1/1998 | McCoy | F16C 11/0661 464/106 |
| 8,701,408 | B2 | 4/2014 | Dettmann et al. | |
| 2002/0120339 | A1 * | 8/2002 | Callaway | A61F 2/4014 623/19.14 |
| 2013/0255250 | A1 | 10/2013 | Naunheim et al. | |

FOREIGN PATENT DOCUMENTS

| | | |
|---|---|---|
| DE | 1940763 A1 | 1/1971 |
| DE | 19519526 A1 | 11/1996 |
| DE | 19536331 A1 | 4/1997 |
| DE | 10138836 A1 | 2/2003 |
| DE | 102010004559 A1 | 7/2011 |
| DE | 102010040583 A1 | 3/2012 |
| EP | 0976919 A2 | 2/2000 |
| FR | 2707712 A1 | 1/1995 |
| FR | 2823795 A1 | 10/2002 |
| JP | 05302618 B2 | 10/2013 |

OTHER PUBLICATIONS

English abstract for DE-10138836.
English abstract for DE-19536331.
English abstract for JP-05302618.
English abstract FR-2823795.
English abstract for FR-2707712.

* cited by examiner

ACTUATING DEVICE AND JOINT

CROSS REFERENCE TO RELATED APPLICATIONS

This application claims priority to German Patent Application No. 10 2012 211 535.8, filed Jul. 3, 2012, and International Patent Application No. PCT/EP2013/063631, filed Jun. 28, 2013, both of which are hereby incorporated by reference in their entirety.

TECHNICAL FIELD

The present invention relates to an actuating device for bi-directionally adjusting an actuator, in particular of an internal combustion engine, having the features of the preamble of claim 1. The invention also relates to a joint for such an actuating device. The present invention finally relates to an exhaust gas turbocharger that is equipped with such an actuating device.

BACKGROUND

EP 0 976 919 B1 discloses an actuating device for bi-directionally adjusting a wastegate valve of a turbocharger of an internal combustion engine. The actuating device comprises an actuator drive for generating actuation forces and a coupling device for transmitting the actuation forces from the actuator drive to the actuator formed by the wastegate valve. To this end, the coupling device is drive-connected on one side to the actuator drive and on the other side to the actuator. The coupling device comprises at least a first coupling member, a second coupling member and a joint that connects the two coupling members to each other in an articulated manner. In the known actuation device, the joint is configured as a ball joint, which comprises a ball formed on the first coupling member and a cylindrical ball receptacle formed on the second coupling member, into which the ball is inserted axially. The actuator drive is configured in the known actuation device as a pneumatic drive, which drives the first coupling member linearly. The second coupling member is connected via a lever arrangement to the wastegate valve, which is mounted such that is can be displaced pivotably about a pivot axis. A linear adjustment movement of the actuator is thus converted into a rotary adjustment movement of the wastegate valve, that is, the actuator, inside the coupling device.

In such actuating devices, which couple kinematically different actuation movements with each other, for example a translatory movement with a rotary movement, at least one joint must be present inside the coupling device in order to avoid stresses inside the coupling device. The joint is designed such that it allows different inclination angles between the coupling members.

Other actuating devices that can likewise have such a construction can be used for example for adjusting a variable turbine geometry or for adjusting flaps of a fresh air system, for example control flaps, tumble flaps or swirl flaps.

The configuration of the joint as a ball joint can be problematic if comparatively large compressive forces must be transmitted but at the same time only comparatively little installation space is available. Reduced installation space limits the maximum ball diameter that can be used. The smaller the ball diameter, the larger the surface pressure and the smaller the compressive forces that can be transmitted.

SUMMARY

The present invention is concerned with the problem of specifying an improved embodiment for an actuating device of the above-mentioned type and for an exhaust gas turbocharger equipped therewith and for an associated joint, which is characterised in particular in that comparatively large compressive forces can be transmitted with a compact design.

This problem is solved according to the invention by the subject matter of the independent claims. Advantageous embodiments form the subject matter of the dependent claims.

The invention is based on the general concept of using only a ball segment instead of a virtually complete ball inside the joint. Since the ball segment can utilise the entire installation space, the associated ball diameter can be selected to be much larger than in the case where a virtually complete ball must be accommodated in the same installation space. In other words, the ball segment used has a ball diameter, the associated sphere of which is much greater than the installation space provided to accommodate the ball segment. The enlarged ball diameter results in reduced surface pressure, which allows larger compressive forces to be transmitted.

In detail, the joint according to the invention comprises a housing, which is fixedly connected to the first coupling member and has a bearing chamber, which is open towards the second coupling member and has a spherical-segment-shaped first bearing face facing away from the first coupling member, the centre of rotation of which bearing face lies on the longitudinal centre axis of the housing. The centre of rotation of the first bearing face corresponds to the centre point of the associated virtual sphere. The joint further comprises a bearing shell, which is fixedly connected to a shaft of the second coupling member and is arranged in the bearing chamber and has a spherical-segment-shaped first counter bearing face, which faces the first coupling member, is shaped in a complementary manner to the first bearing face and bears flat against the latter. Since the first counter bearing face is shaped in a complementary manner to the first bearing face and bears flat against the latter, a centre of rotation of the first counter bearing face and the centre of rotation of the first bearing face are identical.

The ball segment of the interacting bearing faces can expediently be dimensioned such that a maximum deflection that can be expected between the two coupling members when the joint is used properly and as intended is reliably covered by the size of the ball segment selected in each case. The larger the possible deflection between the coupling members, the larger the size of the ball segment must be selected. An outer limit of the bearing shell is preferably selected in such a manner that a connection line of the outermost point of the first counter bearing face on the bearing shell from the ball centre point does not exceed the longitudinal centre axis of the housing even with maximum deflection between the two coupling members.

According to a particularly advantageous embodiment, in which the joint is also suitable for transmitting comparatively large tensile forces, the above-mentioned bearing shell can also have a spherical-segment-shaped second counter bearing face, which faces away from the first coupling member and the centre of rotation of which coincides with the centre of rotation of the first counter bearing face. Furthermore, the joint also comprises in this case a clamping ring, which encloses the shaft of the second coupling member, which projects from the open side of the bearing chamber into the bearing chamber, and is fastened to the housing and has a spherical-segment-shaped second bearing face, which faces the first coupling member, is shaped in a complementary manner to the second counter bearing face and bears flat against the latter. In this case too, a centre of rotation of the second bearing face corresponds identically to the centre of rotation of the second counter bearing face. The bearing shell thus defines with its two counter bearing faces two ball segments, the associated spheres of which are arranged concentrically and correspondingly have the same sphere centre point.

According to an advantageous embodiment, a first radius of the first bearing face and of the first counter bearing face can be greater than half an outer diameter of the housing. Additionally or alternatively, a second radius of the second bearing face and of the second counter bearing face can be greater than half an outer diameter of the housing. These measures mean that the curvature of the spherical-segment-shaped faces is comparatively small, that is, has a relatively large radius and diameter. This leads to a reduction in the surface pressures occurring in the joint, as a result of which the compressive and/or tensile forces that can be transmitted can be increased.

In principle, the first bearing face and the first counter bearing face can bear against each other over their entire area. According to an advantageous embodiment, however, it can be provided for the first bearing face and the first counter bearing face only to bear flat against each other in an annular region, while they are spaced apart axially from each other in a central region enclosed by the annular region. This design makes it possible to make the joint more compact overall in the axial direction.

According to an advantageous development, it can be provided for the first bearing face to be defined by a spherical-segment-shaped annular region that encloses a flat central region. The first counter bearing face can then have in a complementary manner thereto a spherical-segment-shaped annular region and an open central region enclosed thereby.

Additionally or alternatively, it can be provided for the second bearing face to be formed by a spherical-segment-shaped annular region. Additionally or alternatively, the second counter bearing face can be formed by a spherical-segment-shaped annular region.

In principle, it is conceivable for the bearing shell to be formed integrally on the shaft. However, an embodiment is preferred in which the bearing shell is a separate component from the shaft and is connected fixedly to the shaft. A variant constructed in this manner simplifies the production of the individual parts.

According to an advantageous development, the bearing shell designed as a separate component can have a shaft-receiving opening, which passes through the bearing shell and into which the shaft is inserted axially, an axial end face of the shaft being spaced apart axially from the first bearing face. The shaft is thus supported only indirectly on the housing by means of the bearing shell.

According to another advantageous embodiment, the first bearing face can be formed on an insertion part, which is a separate component from the housing and is inserted into the bearing chamber. The use of such an insertion part makes it possible to produce the first bearing face with high precision outside the housing or independently of the housing, as a result of which the production of the housing is simplified. In principle, however, an alternative embodiment is also conceivable, in which the first bearing face is formed integrally on the housing.

In an advantageous development, it can then be provided for the insertion part to be prestressed against the bearing shell by means of at least one spring element. The faces that interact with each other thus always remain in contact, as a result of which relative movements, noise and wear can be reduced.

According to another advantageous embodiment, the clamping ring can enclose the shaft with radial play. This radial play, which is situated at a point at a distance from the centre of rotation of the joint, means that the freedom of movement of the shaft relative to the housing or relative to the clamping ring can be predefined. For example, the shaft can deflected about the centre of rotation of the joint up to no more than 20° or up to no more than 10° out of a coaxial orientation between shaft and housing. The radial play can thus be used to define a movement stop between shaft and clamping ring.

According to another advantageous embodiment, the clamping ring can have an external thread. The housing can have an internal thread, which is shaped in a complementary manner to the external thread of the clamping ring, in an end region that has the open side of the bearing chamber. The clamping ring can then be screwed into the housing. A tightening torque for the clamping ring can be used for example to set a bearing play or a bearing friction inside the joint. The clamping ring can have a radial collar, which projects radially and runs around in the circumferential direction and can act as an axial stop between clamping ring and housing.

According to a preferred embodiment, the first bearing face, the first counter bearing face, the second bearing face and the second counter bearing face can be curved in a convex manner towards the second coupling member. A design for the joint that is particularly compact in the axial direction can be realised thereby. Alternatively, however, an embodiment is also conceivable in which the first bearing face, the first counter bearing face, the second bearing face and the second counter bearing face can be curved in a concave manner towards the second coupling member.

In an exhaust gas turbocharger according to the invention, at least one actuating device of the above-described type is provided in order to be able to operate a wastegate valve or a variable turbine geometry. An exhaust gas turbocharger usually has a compressor to compress fresh air and a turbine to expand exhaust gas, compressor and turbine being drive-connected to each other by means of a common drive shaft. To regulate power, the exhaust gas turbocharger or the turbine thereof can have a wastegate valve, preferably in a petrol engine. Alternatively, the turbine can also be provided with a variable turbine geometry for power regulation, preferably in a diesel engine. In principle it is likewise possible to provide the turbine with both a wastegate valve and a variable turbine geometry. In this case, the wastegate valve can be used e.g. for rapid heating of a downstream catalytic converter.

A joint according to the invention, which can be used for producing an articulated connection that can transmit compressive and tensile forces between a first coupling member and a second coupling member, is thus characterised by a housing that can be connected fixedly to the first coupling member and has a bearing chamber, which has an axial bearing chamber opening and a spherical-segment-shaped first bearing face facing the bearing chamber opening, the centre of rotation of which lies on the longitudinal centre axis of the housing. The joint further comprises a bearing shell, which can be fixedly connected to a shaft of the second coupling member and is arranged in the bearing chamber and has a spherical-segment-shaped first counter bearing face, which faces away from the bearing chamber opening, is shaped in a complementary manner to the first bearing face and bears flat against the latter. So that the joint can also transmit tensile forces, it can optionally be provided for the bearing shell also to have a spherical-segment-shaped second counter bearing face, which faces the bearing chamber opening and the centre of rotation of which coincides with the centre of rotation of the first counter bearing face. The joint further comprises a clamping ring, which projects axially through the bearing chamber opening into the bearing chamber, is fastened to the housing and has a spherical-segment-shaped second bearing face, which faces away from the bearing chamber opening, is shaped in a complementary manner to the second counter bearing face and bears flat against the latter.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
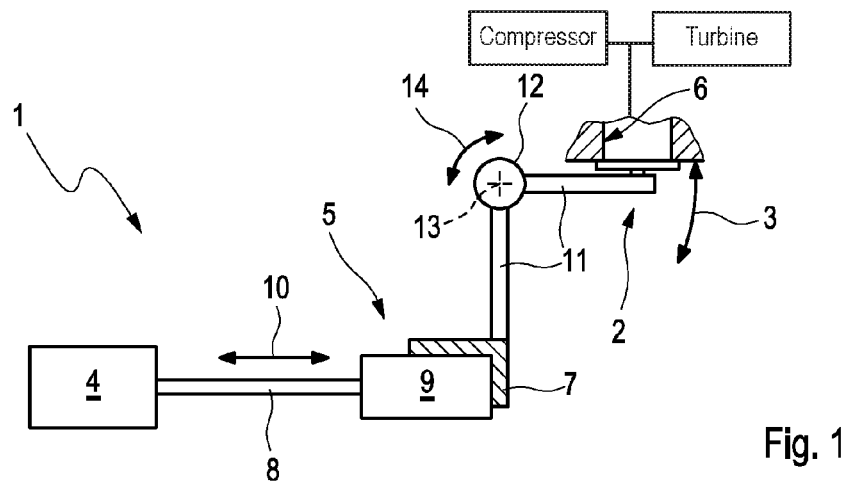
FIG. 1 schematically shows a highly simplified diagram of an actuating device.

According to FIG. 1, an actuating device 1, with the aid of which an actuator 2 can be adjusted bi-directionally according to a double arrow 3, comprises an actuator drive 4 and a coupling device 5. The actuator 2 is a wastegate valve of a turbocharger 6 in the example of FIG. 1. The actuator drive 4 is for example an electric motor and can generate actuation forces that can be both compressive forces and tensile forces. The coupling device 5 is drive-connected on one side to the actuator drive 4 and on the other side to the actuator 2. The coupling device 5 comprises at least a first coupling member 7, a second coupling member 8 and a joint 9 that connects the two coupling members 7, 8 to each other in an articulated manner. The joint 9 can further transmit the tensile and compressive forces of the actuator drive 4 between the two coupling members 7, 8. In the example, the actuator drive 4 is connected to the second coupling member 8, which in this case is rod-shaped and can be adjusted bi-directionally and in a linear and/or translatory manner according to a double arrow 10 with the aid of the actuator drive 4. The first coupling member 7 is however drive-connected to the actuator 2 by means of a lever arrangement 11. The lever arrangement 11 comprises a spindle 12, which is mounted such that it can be displaced in a rotary manner about a rotation axis 13, so that the lever arrangement 11 and thus the actuator 2 can be adjusted bi-directionally and in a rotary manner in relation to the rotation axis 13 according to a double arrow 14. The coupling device 5 thus forms the coupling of a translatory actuation movement of the actuating device 4 with a rotary actuation movement of the actuator 2. In order to allow the relative movement between the two coupling members 7, 8 necessary for this, the joint 9 has a corresponding degree of freedom. At the same time, the joint 9 must be able to transmit the comparatively large forces in the tensile and compressive directions.

Figure 2:
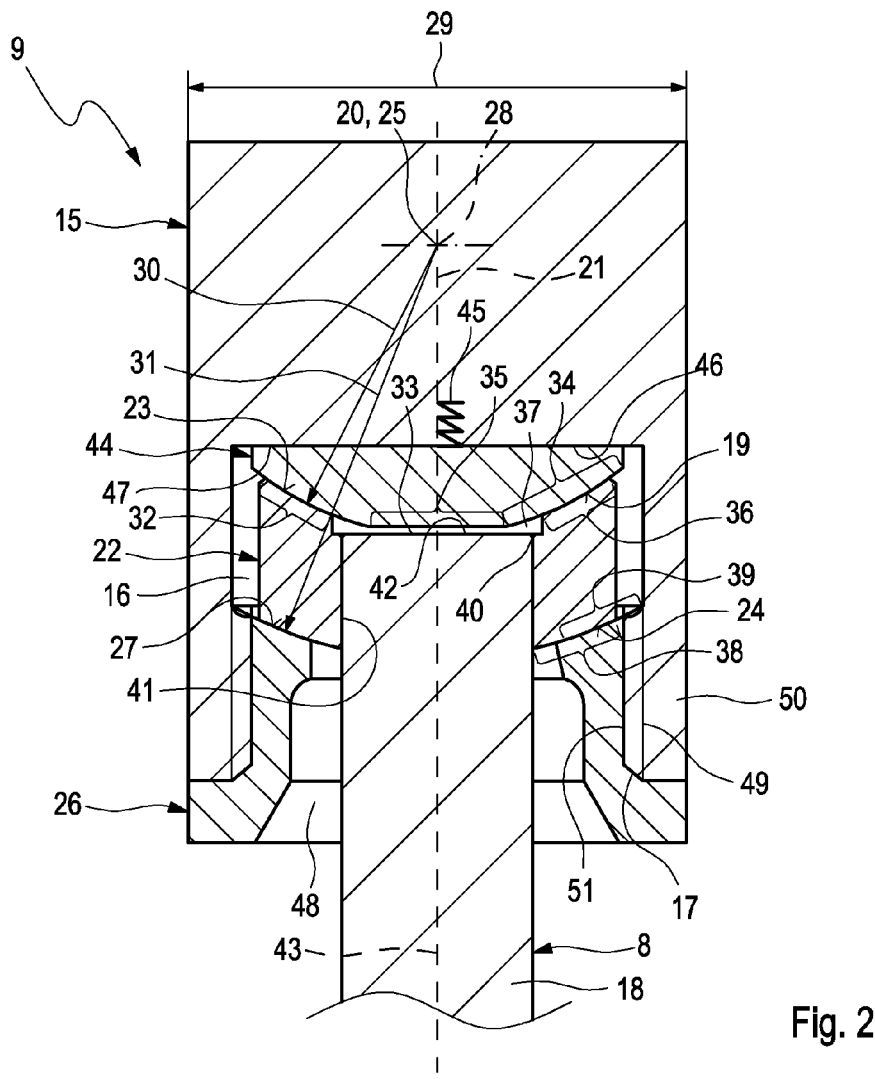
FIG. 2 schematically shows a sectional view through a joint of the actuating device, FIG. 3 schematically shows sectional views through the joint of FIG. 2, but in different assembly states a to e.
Figure 3:
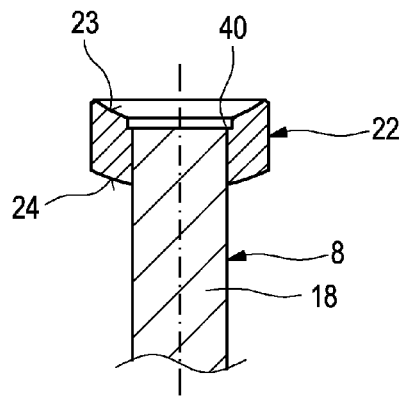
Figure 3:
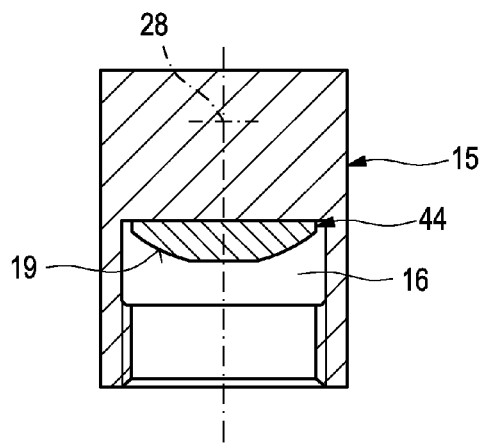
Figure 3:
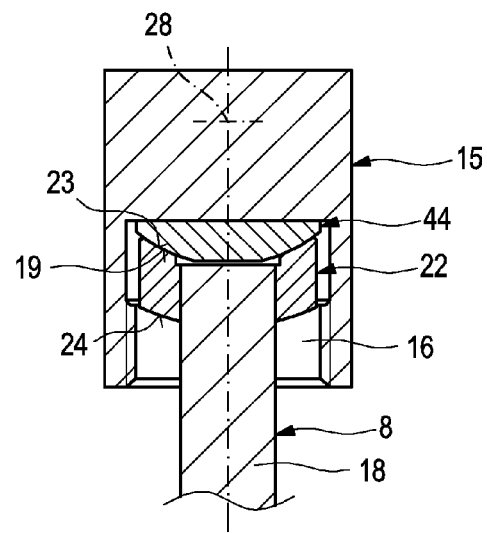
Figure 3:
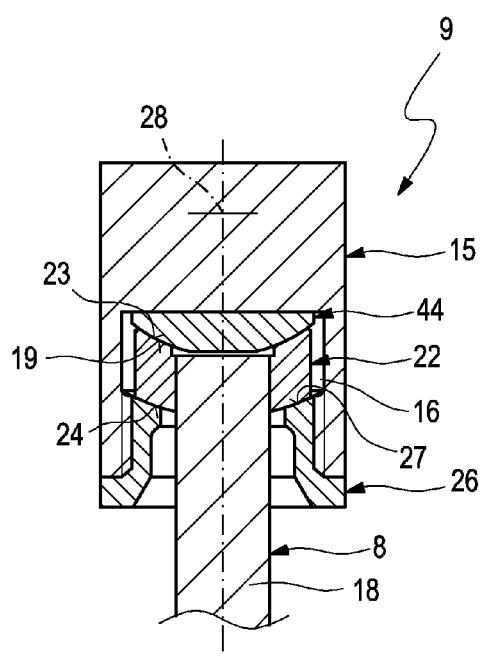
Figure 3:
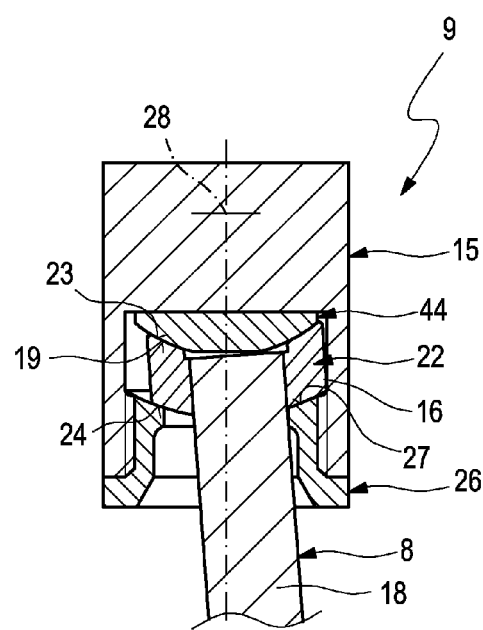

According to FIGS. 2 and 3, the joint 9 comprises a housing 15, which is connected fixedly to the first coupling member 7 when in the installed state. The housing 15 has a bearing chamber 16, which is open towards the second coupling member 8 and has a bearing chamber opening 17. FIG. 2 shows a shaft 18 of the second coupling member 8, which can either be formed integrally on the second coupling member 8 or attached to the second coupling member 8.

The bearing chamber 16 further has a spherical-segment-shaped first bearing face 19, which faces the bearing chamber opening 17 and faces away from the first coupling member 7 when in the installed state, the centre of rotation 20 of which lies on a longitudinal centre axis 21 of the housing 15. The joint 9 also has a bearing shell 22, which can be connected fixedly to the shaft 18 or is connected fixedly when the joint 9 and actuating device 1 are in the assembled state. The bearing shell 22 is arranged in the bearing chamber 16 and has a first counter bearing face 23, which faces away from the bearing chamber opening 17 and is shaped in a complementary manner to the first bearing face 19, that is, is likewise spherical-segment-shaped and bears flat against the first bearing face 19. The bearing shell 22 also has a second counter bearing face 24, which faces the bearing chamber opening 17 and is likewise spherical-segment-shaped, and the centre of rotation 25 of which coincides with the centre of rotation 20 of the first counter bearing face 23. The centre of rotation 20 is identical for the first bearing face 19 and the first counter bearing face 23. The second counter bearing face 24 is likewise spherical-segment-shaped.

The joint 9 also comprises a clamping ring 26, which encloses the shaft 18 when in the assembled state and is inserted from the open side of the bearing chamber 16 into the bearing chamber opening 17 and projects into the bearing chamber 16. The bearing ring 26 is fastened to the housing 15 and has a second bearing face 27, which is spherical-segment-shaped, is shaped in a complementary manner to the second counter bearing face 24 and faces away from the bearing chamber opening 17. The second bearing face 27 bears flat against the second counter bearing face 24 and has the same centre of rotation 25. The centres of rotation of the four spherical-segment-shaped faces ultimately coincide in a common centre point 28, which forms a centre point of concentric spheres, on which the spherical-segment faces of the first bearing face 19 and of the first counter bearing face 23 on one side and of the second bearing face 27 and of the second counter bearing face 24 on the other side lie.

The housing 15 has an outer diameter 29. The first bearing face 19 and the first counter bearing face 23 have a first radius 30 in relation to the common centre point 28 and in relation to the common centre of rotation 20. The second bearing face 27 and the second counter bearing face 24 have a second radius 31 in relation to the common centre point 28 and in relation to the common centre of rotation 25. The first radius 30 and the second radius 31 are each greater than half the outer diameter 29. Thus a first sphere diameter belonging to the first bearing face 19 and to the first counter bearing face 23 is greater than the outer diameter 29. The same applies correspondingly all the more to a second sphere diameter belonging to the second bearing face 27 and to the second counter bearing face 24.

The first bearing face 19 and the first counter bearing face 23 bear flat against each other only in an annular region 32. The first bearing face 19 and the first counter bearing face 23 are however spaced apart from each other in a central region 33 enclosed by the ring region 32. The axial direction is defined by the longitudinal centre axis 21 of the housing 15. For this design, the first bearing face 19 has a spherical-segment-shaped annular region 34 and a flat central region 35 enclosed by the annular region 34. The first counter bearing face 23 has a spherical-segment-shaped annular region 36 and an open central region 37 enclosed by the annular region 36. The second bearing face 27 is formed by a spherical-segment-shaped annular region 38. The second counter bearing face 24 is formed by a spherical-segment-shaped annular region 39.

In the preferred embodiment shown here, the bearing shell 22 is a separate component from the shaft 18 and is connected fixedly to the shaft 18. A welded connection 40, which is expediently formed in the open central region 37, is preferably provided here for the connection. For this design, the bearing shell 22 has a shaft-receiving opening 41, which passes through the bearing shell 22. The shaft 18 is inserted axially into this shaft-receiving opening 41. An axial end face 42 of the shaft 18 delimits the open central region 37 and is spaced apart axially from the first bearing face 19. The flat end face 42 in particular lies opposite the flat central region 35. At least in the starting position shown in FIG. 1, in which the longitudinal centre axis 21 of the housing 15 coincides with a longitudinal centre axis 43 of the shaft 18.

In the example shown here, the first bearing face 19 is formed on an insertion part 44. The insertion part 44 forms a separate component from the housing 15 and is inserted into the bearing chamber 16. In FIG. 2, a spring element 45 is indicated, which can be provided to prestress the insertion part 44 against the bearing shell 22. To this end, the spring element 45 can be supported on one side on a rear side 46 of the insertion part 44 that faces away from the first bearing face 19 and on the other side on a bearing chamber bottom 47 opposite the bearing chamber opening 17 or in a recess cut into the bottom 47.

The clamping ring 26 has a radial play 48 in relation to the shaft 18, which surrounds the shaft 18 uniformly in the circumferential direction in the starting position shown in FIG. 2. The shaft 18 can thereby be rotated spatially about the centre point 28 in relation to the housing 15. The radial play 48 is dimensioned such that a predefined ability to be displaced in a pivotable manner can thereby be ensured for the shaft 18 relative to the housing 15. For example, the shaft 18 should be pivotable by up to no more than 20° or up to no more than 10° relative to the housing 15, the respective pivot angle forming between the longitudinal centre axis 21 of the housing 15 and the longitudinal centre axis 43 of the shaft 18, which intersect at the centre point 28.

In the example, the clamping ring 26 has an external thread 49, while the housing 15 has an internal thread 51, which is formed in a complementary manner to the external thread 49, in an end region 50 having the bearing chamber opening 17. The clamping ring 26 is thus screwed into the housing 15. The screw-in depth and/or a tightening torque of the clamping ring 26 can be used to set a bearing play in the sliding bearings formed by the first bearing face 19 and the first counter bearing face 23 and by the second bearing face 27 and the second counter bearing face 24.

In the embodiment shown here, the first bearing face 19, the first counter bearing face 23, the second bearing face 27 and the second counter bearing face 24 are curved in a convex manner towards the bearing chamber opening 17. This produces a particularly compact construction in the axial direction. In principle, said faces 19, 23, 27, 24 could also be curved in a concave manner.

A possible assembly of the joint 9 shown in FIG. 2 is explained in more detail below using FIGS. 3*a*-3*e*.

First, the shaft 18 is inserted into the bearing shell 22 and connected fixedly thereto, for example by means of a welded connection 40, according to FIG. 3*a*.

According to FIG. 3*b*, the insertion part 44 that has the first bearing face 19 is inserted into the housing 15 and into the bearing chamber 16 thereof. According to FIG. 3*c*, the shaft 18 with the bearing shell 22 is then inserted into the bearing receptacle 16, the first counter bearing face 23 then being supported on the first bearing face 19. According to FIG. 3*d*, the clamping ring 26 is then mounted until the second bearing face 27 makes contact with the second counter bearing face 24. In particular, the faces 19, 23 and 24, 27 that interact with each other should bear against each other in a play-free manner.

According to FIG. 3*e*, the joint 9 thus allows pivot movements between the housing 15 and the shaft 18 about the centre point 28.

The invention claimed is:

1. An actuating device for bi-directionally adjusting an actuator, comprising:
    an actuator drive for generating actuation forces,
    a coupling device, which is drive-connected to the actuator drive and drive-connected to the actuator to transmit the actuation forces from the actuator drive to the actuator,
    the coupling device including a first coupling member, a second coupling member and a joint that connects the first coupling member and the second coupling member to each other in an articulated manner,
    the joint having a housing, which is fixedly connected to the first coupling member and defines a bearing chamber, the bearing chamber being open towards the second coupling member and having a spherical-segment-shaped first bearing face facing away from the first coupling member, the first bearing face having a centre of rotation which lies on a longitudinal centre axis of the housing,
    the joint including a bearing shell, which is fixedly connected to a shaft of the second coupling member, the bearing shell being arranged in the bearing chamber and having a spherical-segment-shaped first counter bearing face, which faces the first coupling member, the first counter bearing face being shaped in a complementary manner to the first bearing face, wherein the first bearing face and the first counter bearing face bear flat against each other in an annular region, and wherein an annular shoulder surface transverse to the longitudinal centre axis is axially spaced from the first bearing face and arranged co-axially with the shaft to at least partially define an axial gap in a central region enclosed by the annular region, and a spherical-segment-shaped second counter bearing face, which faces away from the first coupling member and includes a centre of rotation which coincides with a centre of rotation of the first counter bearing face,
    the joint including a clamping ring, which encloses the shaft of the second coupling member, the clamping ring projecting from an open side of the bearing chamber into the bearing chamber, wherein the clamping ring is secured to the housing and has a spherical-segment-shaped second bearing face, which faces the first coupling member, the second bearing face being shaped in a complementary manner to the second counter bearing face and bears flat against the latter.

2. The actuating device according to claim 1, wherein
    the first bearing face and the first counter bearing face are concentric with the second bearing face and the second counter bearing face about a common centre point, wherein at least one of: a first radius of the first bearing face and the first counter bearing face in relation to the common center point is greater than half an outer diameter of the housing, and a second radius of the second bearing face and the second counter bearing face in relation to the common center point is greater than half an outer diameter of the housing.

3. The actuating device according to claim 1, wherein the bearing shell is a separate component from the shaft and is connected fixedly to the shaft.

4. The actuating device according to claim 3, wherein the bearing shell has a shaft-receiving opening, which passes through the bearing shell and in which the shaft is inserted axially, the shaft-receiving opening at least partially surrounded by the annular shoulder surface on a side facing in a direction towards the first bearing face, wherein an axial end face of the shaft is spaced apart axially from the first bearing face with respect to the longitudinal centre axis, and wherein the axial end face of the shaft and the annular shoulder surface at least partially define the axial gap.

5. The actuating device according to claim 1, wherein the first bearing face is formed on an insertion part, the insertion part being a separate component from the housing and inserted into the bearing chamber.

6. The actuating device according to claim 5, wherein the insertion part is prestressed against the bearing shell via at least one spring element.

7. The actuating device according to claim 1, wherein the clamping ring encloses the shaft and defines a radial play with the shaft.

8. The actuating device according to claim 1, wherein:
the clamping ring has an external thread,
the housing has an internal thread, which is shaped in a complementary manner to the external thread of the clamping ring, the internal thread being arranged in an end region having the open side of the bearing chamber, and
the clamping ring is screwed into the housing.

9. The actuating device according to claim 1, wherein the first bearing face, the first counter bearing face, the second bearing face and the second counter bearing face are curved in a convex manner towards the second coupling member.

10. An exhaust gas turbocharger for an internal combustion engine, comprising:
a compressor for charging fresh air to be supplied,
a turbine, which is drive-coupled to the compressor, for expanding exhaust gas to be discharged, and
an actuating device for operating at least one of a wastegate valve and a variable turbine geometry, the actuating device including:
an actuator device associated with an actuator;
a coupling device drive-connected to the actuator device and drive-connected to the actuator to transmit an actuation force from the actuator device to the actuator, the coupling device including a first coupling member connected in an articulated manner to a second coupling member via a joint;
wherein the joint includes a housing fixedly connected to the first coupling member and defining a bearing chamber, the bearing chamber being open towards the second coupling member and having a spherical-segment-shaped first bearing face facing away from the first coupling member, wherein the first bearing face has a centre of rotation corresponding to a longitudinal centre axis of the housing;
the joint including a bearing shell arranged in the bearing chamber and fixedly connected to a shaft of the second coupling member, the bearing shell including a spherical-segment-shaped first counter bearing face having a profile complementary to the first bearing face, the first bearing face and the first counter bearing face bearing flat against each other in an annular region, and wherein an annular shoulder surface extending transverse to the longitudinal centre axis is axially spaced from the first bearing face and arranged co-axially with the shaft to define an axial gap in a central region enclosed by the annular region, wherein the bearing shell further includes a spherical-segment-shaped second counter bearing face facing away from the first coupling member and including a centre of rotation which coincides with a centre of rotation of the first counter bearing face;
the joint including a clamping ring secured to the housing and enclosing the shaft of the second coupling member, the clamping ring projecting from an open side of the bearing chamber into the bearing chamber; wherein the clamping ring includes a spherical-segment-shaped second bearing face facing the first coupling member, the second bearing face having a profile shaped complementary to the second counter bearing face and bears flat against the latter.

11. The turbocharger according to claim 10, wherein the first bearing face and the first counter bearing face are concentric with the second bearing face and the second counter bearing face about a common centre point, and wherein at least one of:
the first bearing face and the first counter bearing face have a first radius in relation to the common centre point that is greater than half an outer diameter of the housing; and
the second bearing face and the second counter bearing face have a second radius in relation to the common centre point that is greater than half an outer diameter of the housing.

12. The turbocharger according to claim 10, wherein the bearing shell includes a shaft-receiving opening extending axially through the bearing shell with respect to the longitudinal centre axis and the shaft is arranged in the shaft-receiving opening, the shaft-receiving opening at least partially surrounded by the annular shoulder surface on a side facing in a direction towards the first bearing face, and wherein an axial end face of the shaft disposed in the bearing chamber is axially spaced apart from the first bearing face with respect to the longitudinal centre axis, the axial end face of the shaft and the annular shoulder surface at least partially defining the axial gap in the central region.

13. A joint for an articulated connection to transmit compressive and tensile forces between a first coupling member and a second coupling member, comprising:
a housing configured to fixedly connect to the first coupling member, the housing defining a bearing chamber, which has an axial bearing chamber opening and a spherical-segment-shaped first bearing face, the first bearing face facing the bearing chamber opening and having a centre of rotation corresponding to a longitudinal centre axis of the housing,
a bearing shell configured to fixedly connect to a shaft of the second coupling member, the bearing shell arranged in the bearing chamber and including a spherical-segment-shaped first counter bearing face, which faces away from the bearing chamber opening, the first counter bearing face being shaped in a complementary manner to the first bearing face and bears flat against the latter in an annular region, and wherein an annular shoulder surface extending transverse to the longitudinal centre axis is axially spaced from the first bearing face to at least partially define an axial gap in a central region enclosed by the annular region, the bearing shell further including a spherical-segment-shaped second counter bearing face, which faces the bearing chamber opening, the second counter bearing face having a centre of rotation which coincides with a centre of rotation of the first counter bearing face, and a clamping ring, which projects axially through the bearing chamber opening into the bearing chamber, the clamping ring secured to the housing and having a spherical-segment-shaped second bearing face, which faces away from the bearing chamber opening, the second bearing face being shaped in a complementary manner to the second counter bearing face and bears flat against the latter, wherein the bearing shell includes a shaft-receiving opening extending axially through the bearing shell with respect to the longitudinal centre axis and at least partially surrounded by the annular shoulder surface on a side facing towards the first bearing face, the shaft being arranged in the shaft-receiving opening of the bearing shell, and wherein an axial end face of the shaft disposed in the bearing chamber is axially spaced apart from the first bearing face with respect to the longitudinal centre axis to at least partially define the axial gap in the central region together with the annular shoulder surface.

14. The joint according to claim 13, wherein the first bearing face and the first counter bearing face are concentric with the second bearing face and the second counter bearing face about a common centre point, and wherein at least one of (i) the first bearing face and the first counter bearing face have a first radius in relation to the common centre point that is greater than half an outer diameter of the housing, and (ii) the second bearing face and the second counter bearing face have a second radius in relation to the common centre point that is greater than half an outer diameter of the housing.

15. The joint according to claim 13, wherein the bearing shell is fixedly connected to the shaft.

16. The joint according to claim 13, wherein the first bearing face is arranged on an insertion part, the insertion part being a separate component from the housing and inserted into the bearing chamber.

17. The joint according to claim 16, wherein the insertion part is prestressed against the bearing shell via at least one spring element.

18. The joint according to claim 13, wherein the clamping ring encloses the shaft and defines a radial play with the shaft.

19. The joint according to claim 13, wherein the first bearing face, the first counter bearing face, the second bearing face and the second counter bearing face include a curved profile shaped convex towards the second coupling member.

* * * * *